United States Patent [19]

Phillips

[11] Patent Number: 5,029,989
[45] Date of Patent: Jul. 9, 1991

[54] PLZT SHUTTER

[75] Inventor: James R. Phillips, Albuquerque, N. Mex.

[73] Assignee: Motorola, Inc., Schaumburg, Ill.

[21] Appl. No.: 475,504

[22] Filed: Feb. 6, 1990

[51] Int. Cl.$^5$ .......................... G02F 1/01; G02F 1/03; G02F 1/00; G03B 9/08

[52] U.S. Cl. .................................. 350/355; 350/356; 350/374; 350/392; 354/227.1; 354/226

[58] Field of Search ............... 350/355, 356, 374, 392; 354/219, 224, 226, 227.1

[56] References Cited

U.S. PATENT DOCUMENTS 4,525,744  6/1985  Nakamura et al. ................. 354/219
4,704,022  11/1987  Nozawa et al. ..................... 354/219

FOREIGN PATENT DOCUMENTS 0128323  8/1982  Japan ............................ 354/227.1
0299937  12/1987  Japan ............................... 350/355
0183624  7/1989  Japan ................................. 354/226

OTHER PUBLICATIONS

Cutchen et al., "PLZT Electrooptic Shutters: Applications", Applied Optics, vol. 14, No. 8, Aug. 1975, pp. 1866–1873.

Primary Examiner—Eugene R. LaRoche
Assistant Examiner—Evelyn A. Lester
Attorney, Agent, or Firm—Joseph P. Krause

[57] ABSTRACT

A PLZT based shutter system reduces flare produced by reflective surfaces normally associated with PLZT based and other SLR shutter systems by eliminating a diffraction mirror and using highly reflective electrodes directly on the PLZT element to function both as the reflective mirror and as the electrodes to produce the E field in the PLZT element. The invention has an improved performance by reducing flare and has a reduced parts count improving its manufacturability and reliability.

33 Claims, 1 Drawing Sheet

— PRIOR ART —

PLZT SHUTTER

BACKGROUND OF THE INVENTION

This invention relates to light shutters. In particular, this invention relates to electrooptic PLZT light shutters which might be used in a camera for example.

PLZT, which is lanthanum modified lead zirconate titanate, is a polycrystalline material, the structure of which is distorted by the application of an electric field in the material. This crystallographic distortion by an E-field alters the optical properties of the material causing what is known in the art as bi-refringence. A light wave incident upon the PLZT will split into two components. The light wave component perpendicular to the electric field and that which is parallel to the electric field travel at different velocities because the applied electric field changes the index of refraction of the material, depending upon the direction of propagation with respect to the orientation of the E-field. The two light wave components recombine upon exiting the PLZT crystal producing an effective rotation of the polarization of the light wave by the PLZT. With no field applied to the PLZT, light passes through the PLZT unaltered.

The ability of PLZT to rotate the polarization of a light wave has been used to provide a solid state electronic camera shutter when the PLZT is used in combination with at least one other discrete light polarizer. If a light polarizer oriented to polarize light at an angle of forty-five degrees to the E-field is optically coupled to send light to a PLZT element, which when it is subjected to an E-field rotates light ninety degrees, and a second polarizer receiving light from the PLZT is oriented to align with the rotated polarization vector, the light will pass through the second polarizer. When the E-field is removed, the PLZT will no longer rotate the light wave, passing light orthogonal to the orientation of the second polarizer which will then block the light.

A PLZT-based single lens reflex (SLR) shutter is shown in FIG. 1. A light beam from a light source is split into two components by a beam splitter (16) so that a user (32) can view the light source (by means of the reflector which is typically a prism) that will strike the target film (28) when the "shutter" is opened. Light (12) will strike the target film (28) if the light from the PLZT filter (24) is polarized by the PLZT to align with the orientation of the second polarizer (34). The first polarizer (22) orients the light (12) to a single direction so that the PLZT rotates the light to either align with or cross with the orientation of a second polarizer (34). Light from the PLZT (24) will either align with the second polarizer (34) or will be blocked by the polarizer (34) depending upon whether the E-field is applied or removed. (The rotation of polarization by the PLZT actually changes smoothly with the strength of the E-field. Increasing and decreasing field strength increases and decreases rotation substantially proportionately.) Light through the PLZT might have to be rotated in the PLZT or un-rotated depending upon the orientation of the light entering the PLZT, which is determined by the orientation of the first polarizer (22).

An electronic shutter is realized by the orientation of the polarizers (22 and 34) with respect to each other and the state of the E-field on the PLZT. If the first and second polarizers are aligned together, light will pass through both polarizers to the target (28) unless the light is rotated by the PLZT. If the first and second polarizers are orthogonal to each other, light will not pass through the second polarizer unless the PLZT rotates it.

In FIG. 1 a diffraction mirror (16) splits incoming light into two components (18 and 20) so that one component (18) is reflected to a user (32) permitting the user (32) to view what the film (28) will be exposed to. A significant problem with SLR shutter systems including prior art PLZT based shutter systems, is the flare produced by the electrodes on the PLZT surface as well as the flare produced by the diffraction mirror (16). This flare is light reflection produced by reflective surfaces (on the splitter (16), electrodes (26) and other surfaces) which blurs or distorts the image received at the film (28).

Prior art SLR shutters including PLZT based shutters have attempted to reduce the amount of flare by coating reflective surfaces with dark colored, light absorbing coatings. PLZT-based shutters in particular have required coated electrodes on the PLZT element (24) to reduce flare. These coated electrodes have been painted black and the spacing and reflecting bar width of the diffraction mirror coatings being adjusted to reduce flare.

Prior art attempts to reduce the amount of flare are expensive and require precision manufacturing techniques. A PLZT based shutter system which reduces optical flare would be an improvement over the prior art.

SUMMARY OF THE INVENTION

There is provided a PLZT-element-based electrooptic SLR shutter system that reduces optical flare produced from reflective surfaces. Flare is reduced by eliminating the previously required diffraction mirror, providing reflective electrodes on the PLZT that replace the separate mirror and by tilting the PLZT with the reflective electrodes to reflect a component of the incoming light toward another reflective surface to permit a user to view the light source of interest. Reduced flare improves the resolution and image quality at a target, and in the instant case, eliminating the diffraction mirror reduces parts count from the prior art PLZT SLR shutter system.

In addition to acting as a shutter when used with other polarizers, the PLZT device can modulate light passing through it by varying the strength of the E-field applied to the PLZT.

DETAILED DESCRIPTION OF THE PREFERRED EMBODIMENT

Figure 1:
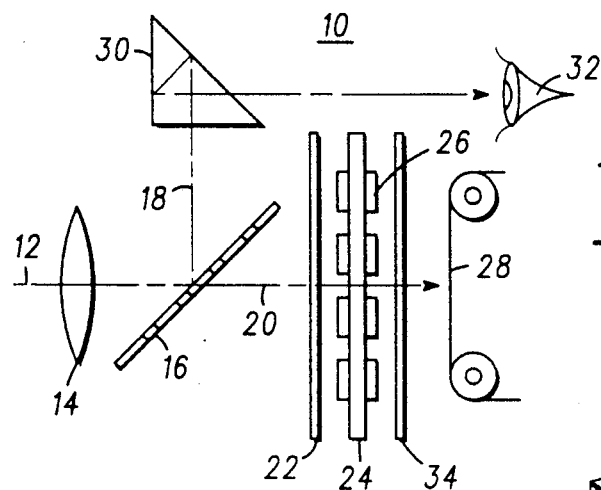
FIG. 1 shows a block diagram of the prior art PLZT based shutter.
Figure 2A:
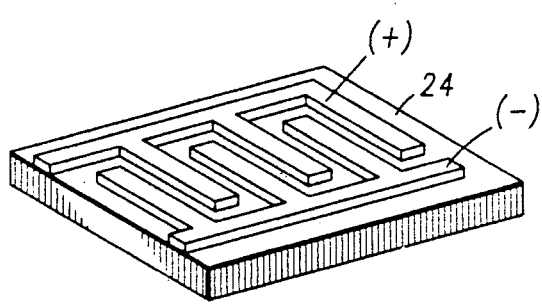
FIG. 2a shows a PLZT element with interdigitated electrode configuration.
Figure 2:
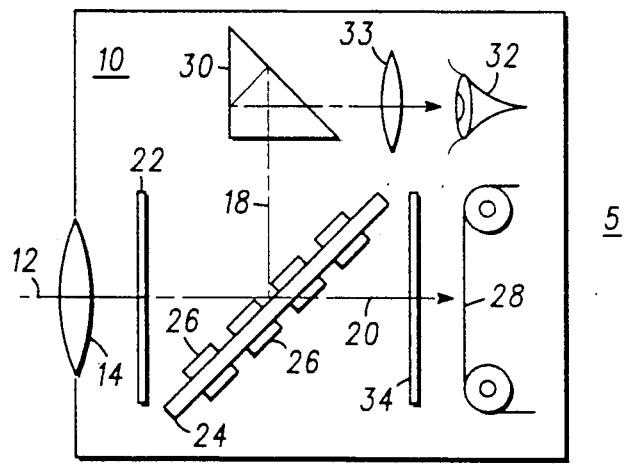
FIG. 2 shows a block diagram of the invention.

FIG. 2 shows a block diagram of the elements of a PLZT-element-based SLR shutter system (10). Incoming light (12) is focused by a lens (14) onto a first polarizer (22) which polarizes light (12) to a substantially single direction. (As is well known in the art, polarization of light is typically accomplished by orienting the electric vector of the light to a single direction.) (The lens would of course have a predetermined focal length appropriate for the distance between the lens (14) and the first polarizer (22).)

Figure 3:
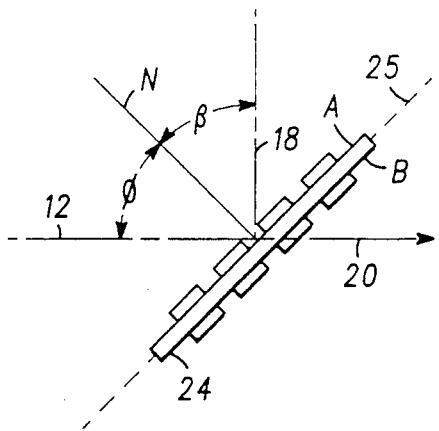
FIG. 3 shows the orientation of the PLZT element in the referred embodiment required to reflect a portion of the incoming light beam.

The polarized light (12) passing through the first polarizer (22) impinges upon the electroded surface of the PLZT element (24) where the light is split into two components (18 and 20). At least one surface of the PLZT is electroded using electrodes which perform at least three functions, beam splitting the light, reflecting one component to another reflector (30), and production of an E-field to the PLZT. (Although one surface should be electroded, alternate embodiments would use PLZT elements with both sides electroded as shown in FIGS. 2 and 3.) The electrodes (26) are typically interdigitated electrodes (26), the arrangement of which is shown in FIG. 2A. Since no separate diffraction mirror is used, the electrodes (26) on the PLZT must be reflective and spaced to act as a beam splitter. Reflective electrodes may be formed on the PLZT using any appropriate process including vacuum deposition, electroplating and machining or any other appropriate process. Other methods of electroding the PLZT so that the electrodes split light may require the electrodes to be polished.

Of the two components (18 and 20) of the incident light signal (12) formed by the beam splitting electrodes (26), one component (20) passes through the PLZT element (24) and impinges upon a second polarizer (34). The orientation of the second polarizer (34) with respect to the first polarizer (22) and the orientation of the second light component (20) upon its exit from the PLZT (24) determine whether or not the second light component (20) reaches the target (28). (The target (28) would most likely be photographic film but might also include a camera or other electrical or chemical image recording surface.)

If the orientation of the second polarizer (34) is at ninety degree with respect to the orientation of the first polarizer (22), and if the PLZT (24) does not rotate the second light component an additional ninety degrees as it passes through the PLZT (24), the second component (20) will be blocked from the target (28). On the other hand, if the orientation of the second polarizer (34) is at ninety degrees with respect to the orientation of the first polarizer (22), and if the PLZT (24) does rotate the second light component an additional ninety degrees as it passes through the PLZT (24), the second component (20) will reach the target (28). Alternatively, if the orientation of the second polarizer (34) is aligned with respect to the orientation of the first polarizer (22), and if the PLZT (24) does, or does not, rotate the second light component an additional ninety degrees as it passes through the PLZT, the second light component (20) will not or will, reach the target (28), respectively. (Rotation of the orientation of the second light component (20) as it passes through the PLZT (24) will depend upon the absence or presence of an electric field through the PLZT (24) as detailed above.) It should be obvious from the foregoing discussion that the transmission of light to the target (28) will depend upon the orientation of the two polarizers (22 and 34) and rotation of the light component (20) by the PLZT (24). Rotation of the light by the PLZT (24), and therefore transmission of the light to the target (28) depends upon the state of the electric field through the PLZT (24).

To permit a user to view the light source prior to its shuttering to the target (28) most SLR systems require that the light be split and one component be made viewable by a user (32). In this invention, since the PLZT element (24) and its electrodes are performing the function of the discrete prior art diffraction mirror, the PLZT element (24) must be positioned, (or tilted as shown in FIG. 2) such that the reflected component (18) of the incident light wave (12) is directed to a viewer comprised of a reflector (30) and an eyepiece (33) sometimes refered to as a viewing port. The light reflector (30) might include a mirror or a prism as shown. An eyepiece (33) might include a lens or other optical device such as a camera or other means for viewing the light wave (12). The light reflector (30) permits a user (32) to view what image will be transmitted to the target (28), before the target is exposed.

In FIG. 3, the PLZT element (24) is shown with a normal, N, perpendicular to the planar faces (A and B) of the PLZT element. The incoming light wave (12) is incident upon the first surface (A) of the PLZT element (24), which is substantially planar, at an angle $\phi$ with respect to the normal N as shown. The reflected component (18) is reflected off the electrodes (26) on the PLZT element leaving the surface at an angle $\beta$ with respect to the normal N as shown. In most applications the angle of incidence $\phi$ and the angle of reflection, $\beta$, will be the same. As shown in FIGS. 2 and 3, the PLZT element (24) is tilted or positioned as shown such that the reflected component of the light wave (18) will be received at the reflector (30). In FIG. 3, the PLZT element (24) faces (A and B) are at an angle of substantially forty five degrees with respect to a ray aligned with the incoming light wave (12).

Various embellishments to the structures shown in FIG. 2 might improve its performance. One improvement to the apparatus is the use of electrodes (26) on both sides (A and B) of the PLZT element (26) as shown in the figures. Electrodes on both sides of the PLZT would improve the E-field in the crystal.

Figure 4:
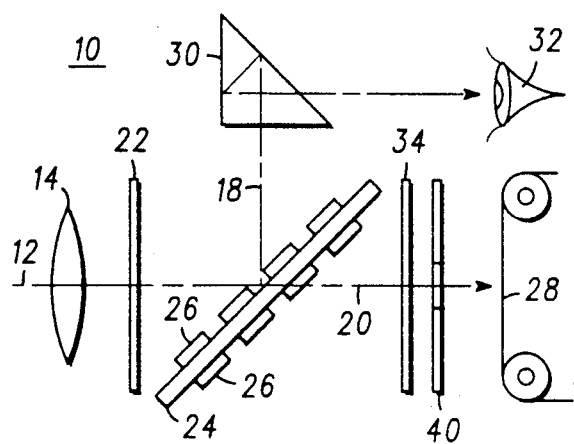
FIG. 4 shows the block diagram of FIG. 2 including an additional mechanical shutter.

Another improvement to the apparatus would be the use of an auxiliary mechanical shutter (40), (which would be controlled to open just before the PLZT-element-based shutter (10) and which closes just after the PLZT-element-based shutter closes) to improve the optical density of the shutter mechanism. FIG. 4 shows that an auxiliary shutter (40) would typically be located between the target and the PLZT element (24).

While the apparatus depicted in FIG. 2 has been described as a shutter for enabling and disabling the transmission of light to a target (28) by the application of an electric field to the PLZT element (24), this apparatus can be used as an electrically adjustable aperture when the electric field impressed on the PLZT is modulated between the values required to completely enable or block light transmission. Stated alternatively, the rotation of the light through the PLZT changes smoothly as a function of the strength of the applied E-field. Changing the E-field in small amounts may change the amount of rotation of the light wave proportionately. Changing the rotation of the light wave in small amounts would permit variable attenuation of light through the shutter system. The apparatus shown in FIG. 2 and 4 with all of the components described as above, could therefore be used as an adjustable aperture by applying a continuously variable electric field, through a varying voltage source coupled to the electrodes (26) perhaps.

Applications of the PLZT shutter (10) described herein would include use with photographic film, as a still camera (5) as shown in FIG. 2 for example. Since the PLZT shutter described herein is capable of shutter speeds much faster than mechanical shutters, a camera with an appropriate target (28) using the PLZT shutter could be used to capture very high speed events.

The PLZT shutter (10) could be used with other types of cameras as well, including a video camera for example. The target (28) in a video camera could be an electronic image sensing device, such as an image sensing charge coupled device or other electronic image sensor.

What is claimed is:

1. A PLZT-element-based shutter system permitting continuous viewing of light from a light source and shuttering of said light from said light source to a target comprising:

a first polarizer means for polarizing light waves, said first polarizer receiving light from said light source;

PLZT element means, having at least a first and second surface, for rotating the orientation of light passing through said element means in response to an electrical field impressed in said element means, said PLZT element being positioned such that light from said first polarizer has a predetermined angle of incidence upon said first surface of said PLZT element;

reflective electrode means coupled to said first surface for impressing an electric field in said PLZT element means, for splitting light from said light source incident onto said first surface into at least first and second light components, said first light component being reflected away from said first surface at a first angle of reflection, said second light component passing through said reflective electrode means into said PLZT element means;

viewing means receiving said first light component reflected from said first surface for permitting viewing said first light component;

a second polarizer means for polarizing light waves to a second, substantially single orientation, said second polarizer receiving said second light component from said PLZT element means such that said second light component either passes through said second polarizer to the target or is attenuated, depending upon said electric field in said PLZT element, the orientation of said first polarizer and the orientation of said second polarizer.

2. The PLZT-element-based shutter system of claim 1 where said reflective electrode means coupled to said first surface is comprised of interdigitated electrodes deposited onto said first surface, said electrodes being shaped, spaced apart, and reflective to act as a diffraction mirror, splitting light incident thereon into at least two components.

3. The PLZT-element-based shutter system of claim 1 where said PLZT element means is a substantially planar PLZT wafer, said first side being substantially planar and having a second substantially planar second side.

4. The PLZT-element-based shutter system of claim 1 where said PLZT element means is positioned such that said angle of incidence is substantially forty five degrees.

5. The PLZT-element-based shutter system of claim 1 where said viewing means is comprised of:

mirror means for receiving said first light component and for reflecting and re-directing said first light component; and view means for permitting viewing of reflected and re-directed first light component.

6. The PLZT-element-based shutter system of claim 5 where said mirror means is a prism.

7. The PLZT-element-based shutter system of claim 1 where said target is photographic film.

8. The PLZT-element-based shutter system of claim 1 where said target is an electronic recording surface.

9. The PLZT-element-based shutter system of claim 1 further comprised of:

at least a first focusing lens having a first focal length for receiving light from said light source and focusing said light onto said first polarizer means.

10. The PLZT-element-based shutter system of claim 1 further comprised of:

electrodes on said second surface aligned with electrodes on said first surface.

11. The PLZT-element-based shutter system of claim 1 further including:

a mechanical shutter means positioned between said PLZT element means and said target which opens before and closes after said PLZT shutter for increasing non-operating optical attenuation of said PLZT element means.

12. A PLZT-element-based shutter system permitting continuous viewing of a light source and providing electrically variable attenuation of light through said shutter system, comprising:

a first polarizer means for polarizing light waves, said first polarizer receiving light from said light source;

PLZT element means, having at least a first and second surface, for rotating the orientation of light passing through said element means in response to an electrical field impressed in said element means, said PLZT element being positioned such that light from said first polarizer has a predetermined angle of incidence upon said first surface of said PLZT element;

reflective electrode means coupled to said first surface for impressing a varying electric field in said PLZT element means, for splitting light from said light source incident onto said first surface into at least first and second light components and for reflecting said first light component away from said first surface at a first angle of reflection, said second light component passing through said reflective electrode means into said PLZT element means, said vary electric field variably rotating polarization of said second light component;

viewing port means receiving said first light component reflected from said first surface for permitting viewing said first light component;

a second polarizer means for polarizing light waves to a second, substantially single orientation, said second polarizer receiving said second light component from said PLZT element means such that said second light intensity is variably attenuated depending upon said varying electric field in said PLZT element, the orientation of said first polarizer and the orientation of said second polarizer.

13. The PLZT-element-based shutter system of claim 12 where said reflective electrode means coupled to said first surface is comprised of interdigitated electrodes deposited onto said first surface, said electrodes being shaped, spaced apart, and reflective to act as a diffraction mirror, splitting light incident thereon into at least two components.

14. The PLZT-element-based shutter system of claim 12 where said PLZT element means is a substantially planar PLZT wafer, said first side being substantially planar and having a second substantially planar second side.

15. The PLZT-element-based shutter system of claim 12 where said PLZT element means is positioned such that said angle of incidence is substantially forty five degrees.

16. The PLZT-element-based shutter system of claim 12 where said viewing port means is comprised of:
    mirror means for receiving said first light component and for reflecting and re-directing said first light component; and
    view means for permitting viewing of reflected and re-directed first light component.

17. The PLZT-element-based shutter system of claim 16 where said mirror means is a prism.

18. The PLZT-element-based shutter system of claim 12 where said target is photographic film.

19. The PLZT-element-based shutter system of claim 12 where said target is an electronic recording surface.

20. The PLZT-element-based shutter system of claim 12 further comprised of:
    at least a first focusing lens having a first length for receiving light from said light source and focusing said light onto said first polarizer means.

21. The PLZT-element-based shutter system of claim 12 further comprised of:
    electrodes on said second surface aligned with electrodes on said first surface.

22. The PLZT-element-based shutter system of claim 12 further including:
    a mechanical shutter means positioned between said PLZT element means and said target which opens before and closes after said PLZT shutter for increasing non-operating optical attenuation of said PLZT element means.

23. A camera permitting continuous viewing of light from a light source and shuttering of said light from said light source to a target comprising:
    a first polarizer means for polarizing light waves, said first polarizer receiving light from said light source;
    PLZT element means, having at least a first and second surface, for rotating the orientation of light passing through said element means in response to an electrical field impressed in said element means, said PLZT element being positioned such that light from said first polarizer has a predetermined angle of incidence upon said first surface of said PLZT element;
    reflective electrode means coupled to said first surface for impressing an electric field in said PLZT element means, for splitting light from said light source incident onto said first surface into at least first and second light components. said first light component being reflected away from said first surface at a first angle of reflection, said second light component passing through said reflective electrode means into said PLZT element means;
    viewing port means receiving said first light component reflected from said first surface for permitting viewing said first light component;
    a second polarizer means for polarizing light waves to a second, substantially single orientation, said second polarizer receiving said second light component from said PLZT element means such that said second light component either passes through said second polarizer to the target or is attenuated, depending upon said electric field in said PLZT element, the orientation of said first polarizer and the orientation of said second polarizer.

24. The camera of claim 23 where said reflective electrode means coupled to said first surface is comprised of interdigitated electrodes deposited onto said first surface, said electrodes being shaped, spaced apart, and reflective to act as a diffraction mirror, splitting light incident thereon into at least two components.

25. The camera of claim 23 where said PLZT element means is a substantially planar PLZT wafer, said first said being substantially planar and having a second substantially planar second side.

26. The camera of claim 23 where said PLZT element means is positioned such that said angle of incidence is substantially forty five degrees.

27. The camera of claim 23 where said viewing port means is comprised of:
    mirror means for receiving said first light component and for reflecting and re-directing said first light component; and
    view means for permitting viewing of reflected and re-directed first light component.

28. The camera of claim 27 where said mirror means is a prism.

29. The camera of claim 23 where said target is photographic film.

30. The camera of claim 23 where said target is an electronic recording surface.

31. The camera of claim 23 further comprised of:
    at least a first focusing lens having a first focal length for receiving light from said light source and focusing said light onto said first polarizer means.

32. The camera of claim 23 further comprised of:
    electrodes on said second surface aligned with electrodes on said first surface.

33. The PLZT-element-based shutter system of claim 23 further including:
    a mechanical shutter means positioned between said PLZT element means and said target which opens before and closes after said PLZT shutter for increasing non-operating optical attenuation of said PLZT element means.

* * * * *

UNITED STATES PATENT AND TRADEMARK OFFICE
CERTIFICATE OF CORRECTION

PATENT NO. : 5,029,989

DATED : July 9, 1991

INVENTOR(S) : James R. Phillips

It is certified that error appears in the above-identified patent and that said Letters Patent is hereby corrected as shown below:

Col. 7, line 28, between the words "first" and "length" insert --focal--.

Signed and Sealed this

Tenth Day of November, 1992

Attest:

DOUGLAS B. COMER

Attesting Officer       Acting Commissioner of Patents and Trademarks